T. G. PLANT.
HEEL BREASTING MACHINE.
APPLICATION FILED JUNE 11, 1909.

1,107,838.

Patented Aug. 18, 1914.
5 SHEETS—SHEET 5.

Witnesses:
Roswell F. Hatch
Redfield H. Allen

Inventor:
Thomas G. Plant
by Robt P. Hains
Att'y.

UNITED STATES PATENT OFFICE.

THOMAS G. PLANT, OF BOSTON, MASSACHUSETTS, ASSIGNOR TO UNITED SHOE MACHINERY COMPANY, OF PATERSON, NEW JERSEY, A CORPORATION OF NEW JERSEY.

HEEL-BREASTING MACHINE.

1,107,838.   Specification of Letters Patent.   Patented Aug. 18, 1914.

Application filed June 11, 1909.   Serial No. 501,449.

*To all whom it may concern:*

Be it known that I, THOMAS G. PLANT, a citizen of the United States, residing in Boston, in the county of Suffolk and State of Massachusetts, have invented an Improvement in Heel-Breasting Machines, of which the following description, in connection with the accompanying drawings, is a specification, like letters on the drawings representing like parts.

The invention to be hereinafter described relates to machines for treating the bottom portions of boots and shoes and more particularly to machines of this general character having means for acting upon heels.

The aims and purposes of the present invention are to provide a machine more especially designed to breast the heels of boots and shoes, which will be simple in construction and efficient and rapid in operation, all of which, and other objects, will best be made clear from the following description and accompanying drawings of one form or embodiment of means for carrying the invention into practical effect, it being understood that the invention is not circumscribed by the illustrated and described details, but is defined in its true scope in the claims.

Figures 5, 6, 7:
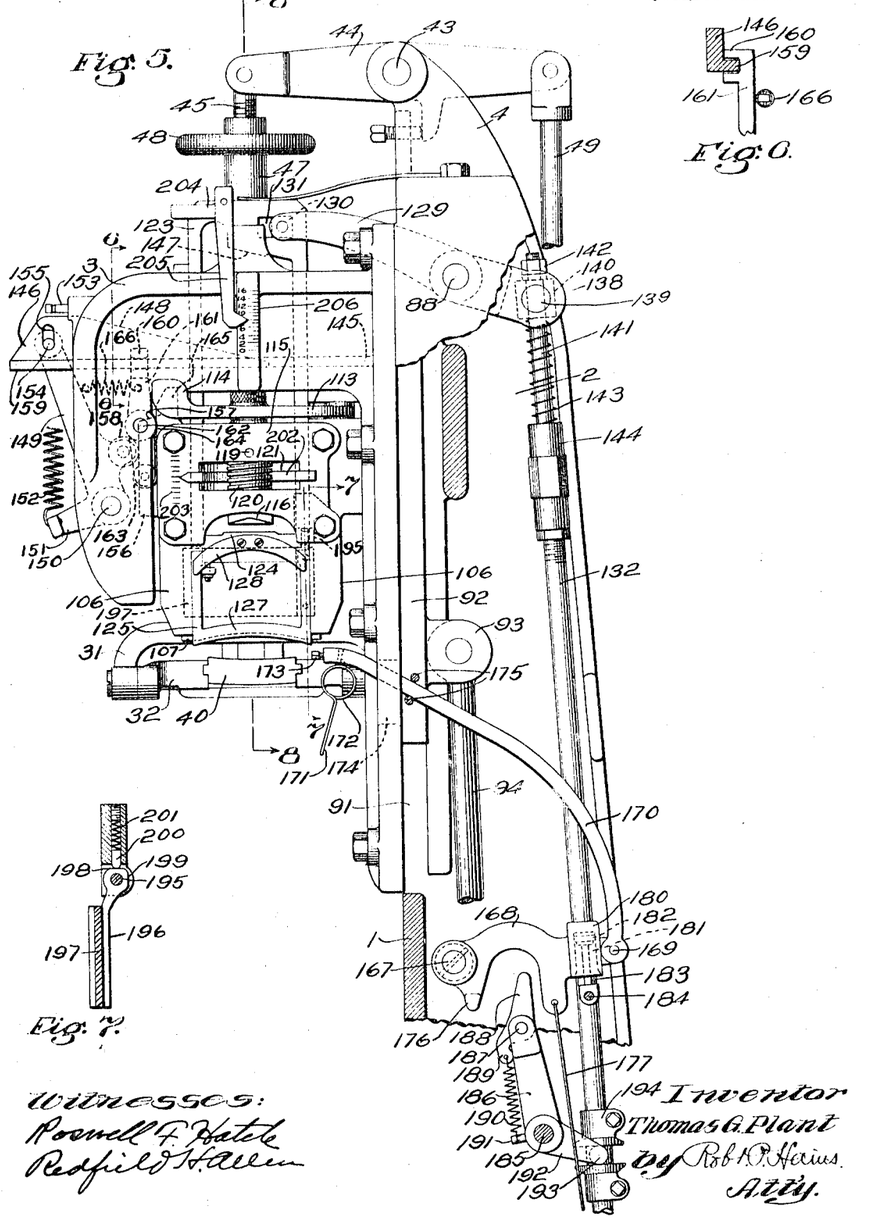
Fig. 5 is an enlarged detail view in front elevation of the upper part of the machine, some of the parts being broken away and others shown in section to disclose parts beyond.
Fig. 6 is a detail sectional view on line 6—6, Fig. 5, showing the means for locking the breaster stop supporting means.
Fig. 7 is a detail view on line 7—7, Fig. 5, showing the chip guard and the manner of supporting it in front of the breaster knife.
Figure 8:
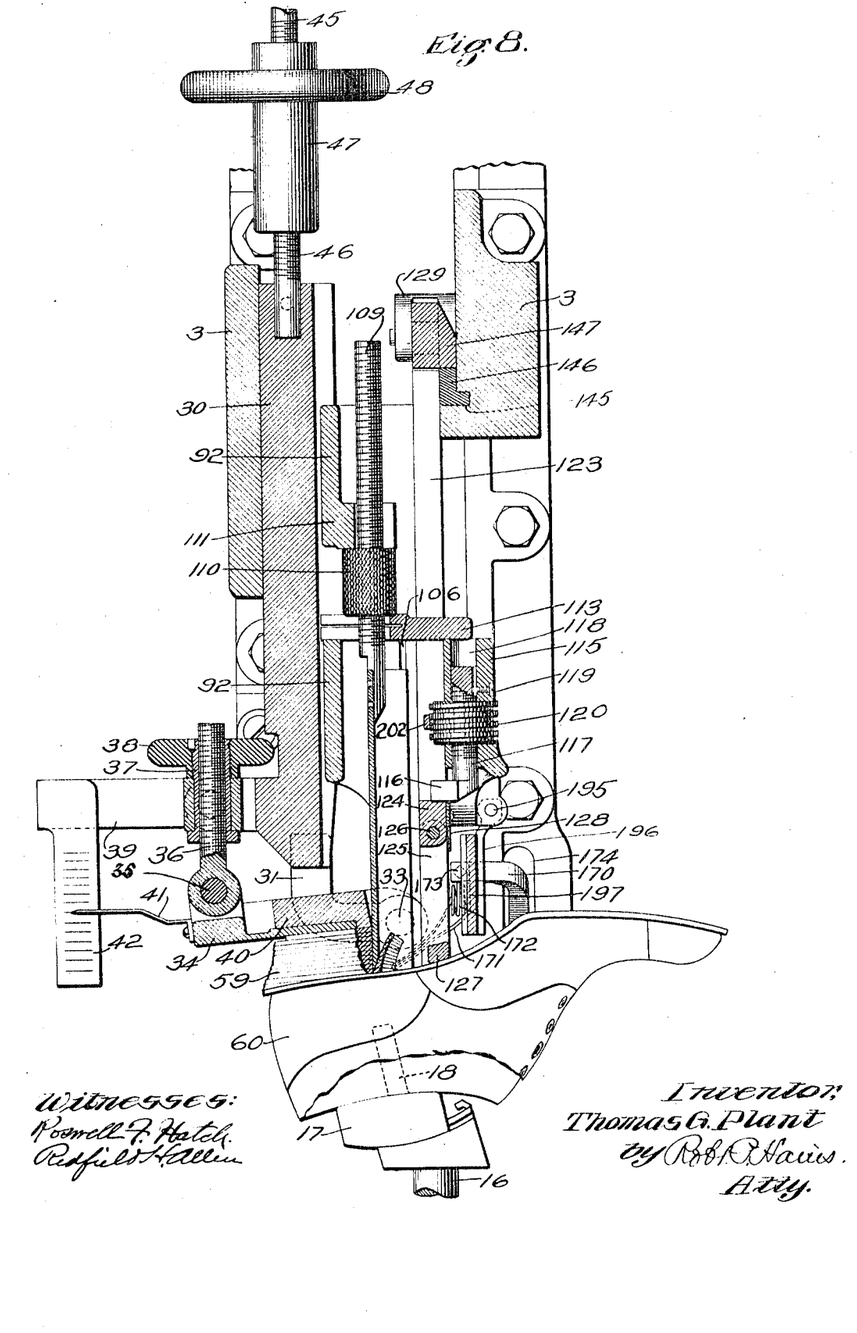
Fig. 8 is an enlarged detail sectional view on the line 8—8, Fig. 5.

The machine frame for supporting the operating parts of the machine may be of any usual or desired character, and herein is represented as a column 1 having suitable upwardly extending portions 2, Fig. 5, and brackets 3 and 4, Figs. 5 and 8, for sustaining and guiding the moving parts. These features may be in form and kind suitable to the purpose intended.

Figures 1, 2:
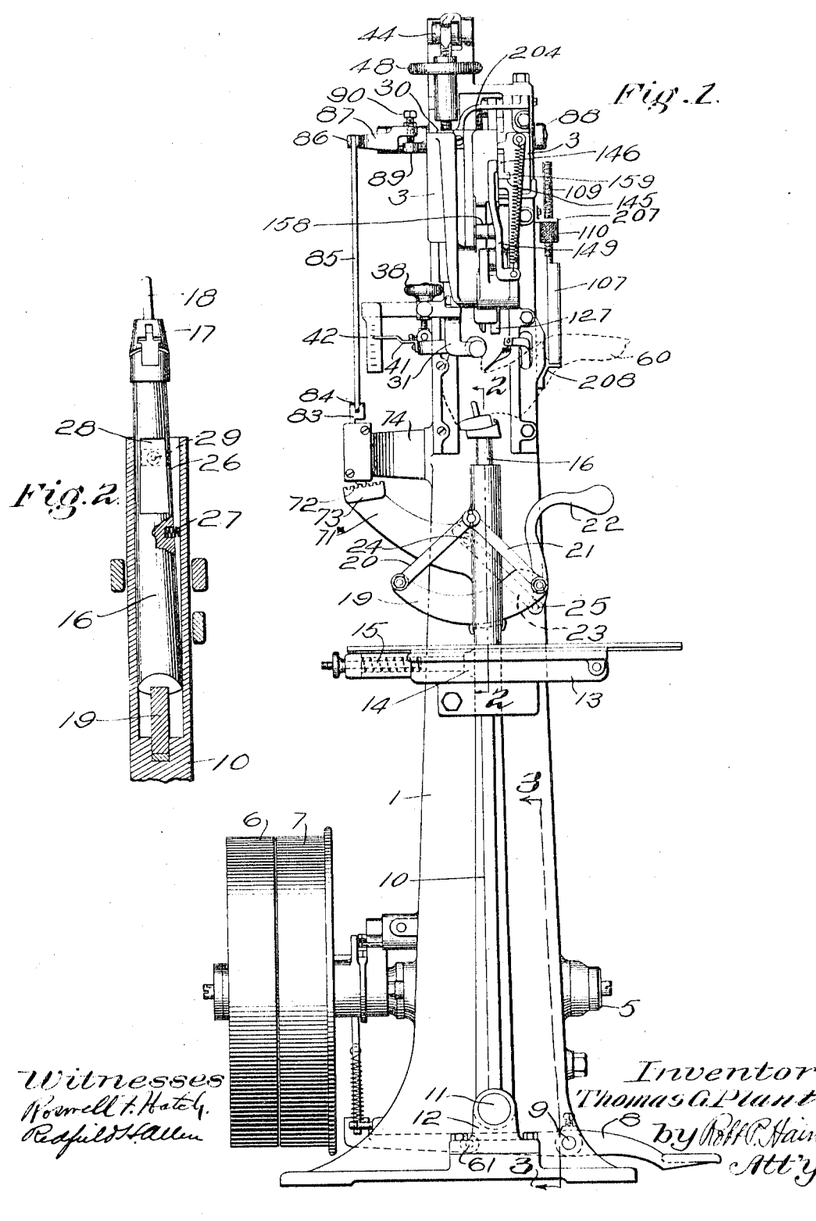
Figure 1 is a side elevation of a machine embodying the features of the present invention.
Fig. 2 is a detail sectional view on line 2—2, Fig. 1, showing the shoe support or jack that may be employed.
Figures 3, 4:
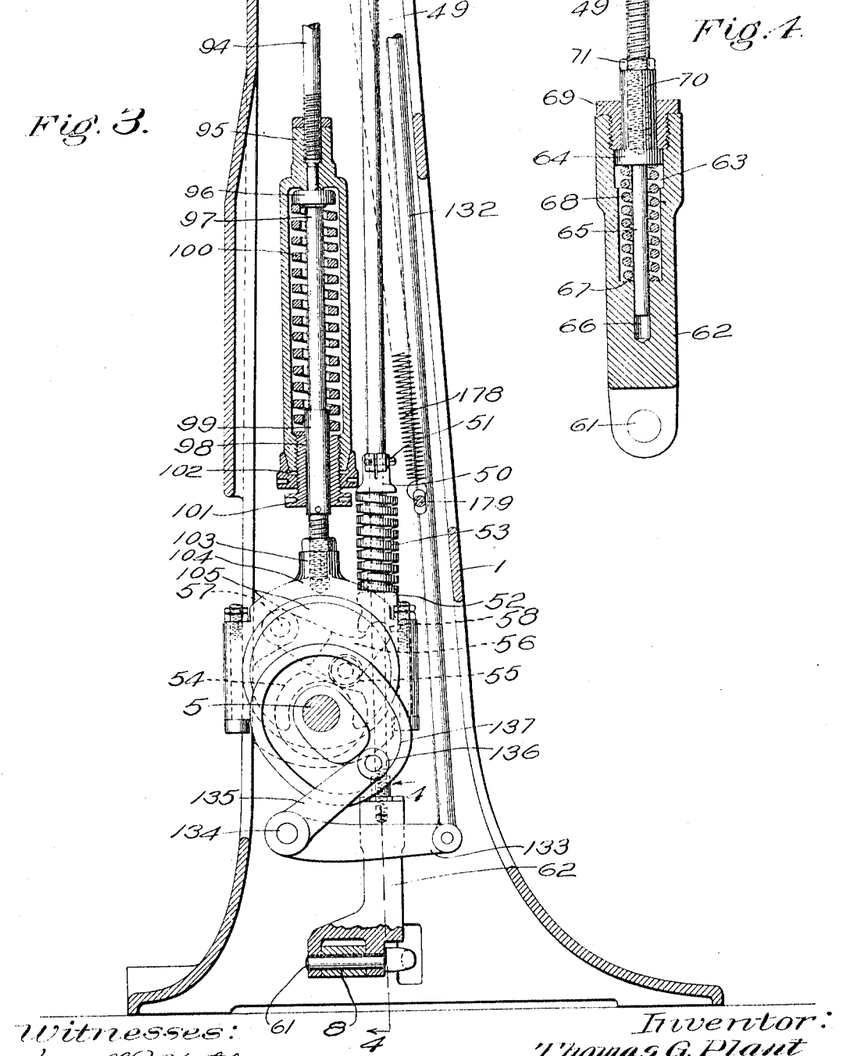
Fig. 3 is an enlarged sectional view of the lower portion of the machine on the line 3—3, Fig. 1.
Fig. 4 is an enlarged sectional detail of the lower portion of the presser-plate actuator, on line 4—4, Fig. 3.

Mounted in bearings in the lower portion of the column 1 is the main shaft 5, Figs. 1 and 3, provided with suitable driving means, as the pulleys 6 and 7, both of which may be loose on the shaft, so that when the belt is shifted to the pulley 6, said pulley may run idle without danger of starting the machine even though the machine starting means be operated. The pulley 7, however, while loose upon the driving shaft 5, may be connected thereto at desired times to cause one rotation of the said shaft, whereupon the shaft comes to rest. Any suitable form of clutch may be employed to thus connect the shaft 5 with the pulley 7 for one rotation thereof and then interrupt said connection and bring the shaft to rest, such clutch being preferably operated by a treadle 8, pivoted at 9 to the column 1. This clutch may be of the general form and character set forth in application, Ser. No. 413,540, filed Jan. 31, 1908, or of any other usual or desired type well known to those skilled in the art, and as it forms no part of the present invention it need not be further described.

Sustained upon the machine frame 1 at the lower part thereof is the supporting arm 10, Fig. 1, pivoted at 11 to suitable lugs or bearings 12. The supporting arm 10 extends upward through the longitudinally slotted guide 13 and is provided with a bumper 14 adapted to contact with a spring supported plunger 15 when the arm 10 is moved rearward, or to the left, Fig. 1, to bring the shoe support or jack in heel breasting position.

The shoe support or jack may be of any desired type, that illustrated comprising a post 16 carrying a sliding last pin block 17 and last pin 18, Fig. 2, to engage the last pin socket of a last when the shoe to be treated is on a last. At its lower end the post 16 rests on a segmental wedge 19 hung upon the arm 10 by the hangers or links 20, 21, Fig. 1, a handle 22 being provided to manipulate the wedge segment 19 in order to raise or lower the post 16 and consequently the position of the shoe supported by the jack, as will be apparent. A link 23 pivoted to the arm 10 at 24 and to the handle 22 at 25 serves to keep the handle in convenient position for manipulating the segment, as will be apparent. The post 16 is normally held to one side in the socket 26 in the upper end of the arm 10 by a light spring 27, Fig. 2, and is moved into position sidewise against the action of the spring 27 by the operator, being guided in this movement and restrained from rotation by the surfaces 28 and guides 29.

Figures 9, 10:
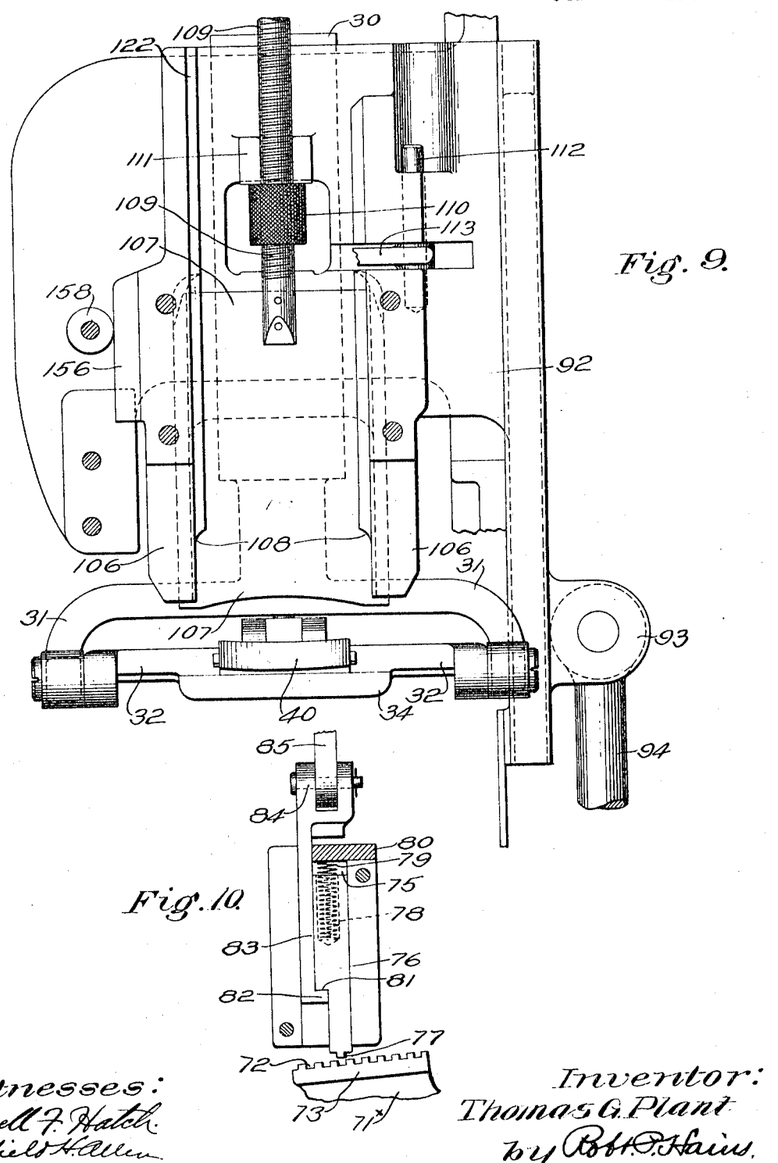
Fig. 9 is an enlarged front view showing the knife, its slide, and adjacent parts.
Fig. 10 is a detail partly in section showing the means for locking the shoe support or jack in heel breasting position.

Mounted to slide vertically in suitable guides provided in the rear bracket 3, Figs. 1 and 8, is a presser-foot slide 30 having arms 31, 31, at the lower portion, Figs. 8 and 9, to which is pivotally connected at 33 the arms 32 of the presser-foot carrier 34, substantially as in my prior Patent No. 958,306, dated May 17, 1910. The rear part of the presser-foot carrier 34 has connected thereto at 35 the screw 36 threaded into an internally screw-threaded sleeve 37 sustained by an arm 39 projecting from the presser foot slide 30, Fig. 8, said sleeve 37 having secured thereto the hand wheel 38 by which the slant or inclination of the presser-foot carrier may be varied. The presser-foot carrier 34 removably supports the presser-plate 40, the front edge of which is formed to correspond to the contour desired for the heel breast. For different heel breast contours different presser-plates may be readily substituted for each other in the carrier.

Extending rearward of the presser-foot carrier 34 is a finger or pointer 41 movable over a scale 42 depending from the bracket or arm 39 projecting from the presser-foot slide 30, whereby the operator is enabled to readily adjust the presser-foot carrier and plate 40 to the requirements of the heel breast, as will be readily understood by those skilled in the art.

Mounted on the bracket 4, at 43, Fig. 5, is a lever 44, one end of which is connected to the presser-foot slide 30 by the right and left screw threaded pins or rods 45 and 46, Figs. 1 and 8, and internally right and left threaded sleeve 47, a hand wheel 48 being provided on the sleeve 47 for conveniently adjusting the length of the connection between the end of the lever 44 and the slide 30, whereby the position of the presser-foot carrier 34 and presser-plate 40, when the slide is at the lower limit of its stroke, may be adjusted to suit heels of different heights. Connected to the other arm of the lever 44 is a lever actuator 49, Figs. 3 and 5, preferably extending down inside the column 1, and having secured thereto by a clamp or set screw 51 a foot or collar 50, Fig. 3. Disposed between the fixed collar 50 and collar 52 loose on said actuator or rod 49 is a spring 53, whereby, upon upward movement of the loose collar 52, the actuator or rod 49 will be lifted by a yielding force.

Mounted on the main shaft 5 is a cam 54, see dotted lines, Fig. 3, on which travels a roll 55 carried by a lever or arm 56 pivoted at 57 to the column 1, the end 58 of said lever finding a seat in the under surface of the loose collar 52, the construction being such that upon rotation of the shaft 5 the actuator or rod 49 will be lifted with a yielding force and the presser-plate 40 be clamped or forced upon the heel 59, Fig. 8, of a shoe 60 presented for the breasting operation.

It is desirable that the presser-plate be first brought into contact with the heel by a light pressure to enable the heel to be adjusted in proper position for the breasting operation, or that the breast edge of the top-lift may be made to conform in position with the edge of the presser-plate, and to this end the following construction is provided as one embodiment of this feature of the invention.

Pivotally connected to the treadle 8 at 61, Figs. 1 and 3, is an arm 62 extending upward from the treadle and having a socket 63 in which is movable a piston or plate 64, Fig. 4, having a stem 65 guided at its lower end, as by a socket 66 in the arm 62. Disposed between the piston 64 and the shoulder 67 of the arm 62 is the spring 68 normally acting to maintain the piston raised and seated against the under side of a screw-threaded cap 69, Fig. 4.

The lower end of the actuator or rod 49, Figs. 3 and 4, is preferably screw-threaded and engages a sleeve 70, Fig. 4, which is movable through the screw-threaded cap 69 connected to the arm 62. The sleeve 70 is preferably screw-threaded to the lower end of the actuator or rod 49 and a set nut 71 may be employed to maintain the sleeve 70 in adjusted position on the rod 49, said sleeve 70 being formed as part of the piston 64.

From the construction thus described it will be apparent that upon depression of the treadle 8 the arm 62 will be raised and with it the actuator or rod 49, thus bringing the presser-plate down upon the heel of the shoe, due to the preliminary movement or depression of the treadle, and that such actuation of the presser-plate is of a yielding nature due to the spring 68 and its adjunctive parts, as hereinbefore described. The preliminary depression of the treadle, just described, is not sufficient to cause the clutch engagement between the pulley 7 and the driving shaft 5, so that the presser-plate becomes seated upon the heel with a substantial but light pressure, in the manner described, before the machine starts into its power actuation. Upon further depression of the treadle, however, the pulley 7 is clutched to the driving shaft 5 and, through the cam 54, lever 56, and loose collar 52, the actuator or rod 49 will be further operated to cause the presser-plate to be moved against a heel with a clamping pressure which is thus power applied.

While the presser-plate 40 is held upon the heel with the preliminary pressure, as above described, it is desirable that the shoe and its support be free for movement so that the heel breast may be brought into proper position relative to the edge of the presser-plate, and that, as the presser-plate is forced into clamping action upon the heel by the parts hereinbefore described, it is desirable that the shoe support be then locked so that further movement of the shoe or its support is prevented. To this end the following device is employed as one embodiment of this feature of the invention.

Projecting rearward from the upper part of the arm or support 10 is a bracket 71$^x$, having a series of teeth 72 carried by an enlarged head portion 73, Fig. 1. Projecting rearwardly from the upper part of the column 1 is a bracket arm 74 having a guideway 75, Fig. 10, for a locking bolt 76 having its lower end 77 formed for engagement with any one of the locking teeth 72 on the head 73. While only one locking bolt is illustrated in the drawing, it is to be understood that more than one may be employed where a nicety of locking action is desired, so that one of the series of bolts may engage with a locking tooth on the head 73, in a manner well understood by those skilled in the art.

The locking bolt 76 is provided with a recess 78 in which is seated a spring 79, the upper end of which bears upon a cap piece 80 carried by the bracket arm 74, the normal tendency of the spring 79 serving to depress the locking bolt 76 into locking engagement with the head 73. The locking bolt 76 has a shouldered portion 81, Fig. 10, which overlies a foot or toe portion 82 carried by a lifter 83 guided for movement in the end of the bracket arm 74. The upper end of the lifter is connected at 84 to a link 85 which is itself jointed at 86, Fig. 1, to an arm 87 operatively connected to a shaft 88, whereby, upon movement of said shaft clockwise, Figs. 1 and 5, the arm 87 will be actuated to lift the locking bolt 76 from locking engagement with the head 73 carried by the shoe support. In order that the arm 87, and consequently its path of lifting action may be properly adjusted, it is connected to the shaft 88 by means of an arm 89, Fig. 1, and an adjusting screw 90, whereby upon manipulation of the adjusting screw 90 the arm 87 may be adjusted to change the path of movement of the locking bolt 76, as will be readily understood by those skilled in the art.

Mounted in suitable guideways 91, Fig. 5, is a knife carrier slide 92 having lugs 93 to which is connected the rod or knife slide actuator 94. The rod 94 for actuating the knife carrier slide, see Fig. 3, is connected to the main driving shaft so as to be yieldingly reciprocated thereby, in order to draw down or depress the knife carrier slide with the yielding action in a manner as will presently appear. As one means of carrying this characteristic action into effect, the rod 94 has connected thereto the cylinder 95, Fig. 3, in which is reciprocally mounted the piston or plunger 96, Fig. 3, connected to a rod 97, the lower bearing portion 99 of which passes through an appropriate bearing in the threaded nut 98, said nut being screw-threaded into the lower end of the cylinder 95 and sustaining one end of a spring 100 contained in the cylinder 95, the upper end of said spring being seated against the piston 96. The threaded nut 98 has a capstan head 101 by which it may be readily turned to adjust the tension of the spring 100 to suit the conditions of work, and the lock nut 102 is preferably employed to hold the parts in adjusted position. The rod 97 has a screw thread connection at 103 with an eccentric strap 104, Fig. 3, which embraces an eccentric 105 secured to the main shaft 5, the construction being such that upon rotation of the main shaft 5 the eccentric will be turned in a manner well understood, and the rod 97 will pull down or depress the knife carrier slide in a yielding manner due to the action of the spring 100 and the parts hereinbefore described.

The knife carrier slide 92, Figs. 5 and 9, carries appropriate guides 106 for the breasting knife 107, the guides 106 having their inner edge portions cut away, as at 108, Fig. 9, in order to increase the width of cutting action of the knife, if desired. The knife 107, Fig. 9, has secured to its upper end portion a screw-threaded rod 109 having screw-threaded thereto an adjustable nut or knife holder 110. Mounted upon the knife carrier slide 92 is a stop 111 against which the upper surface of the adjustable holder 110 abuts when the knife is in position on the holder and which takes up the thrusting action of the knife during its cutting operation. In order that the knife may be readily removed and another one substituted when desired, the stop 111 is preferably bifurcated, as indicated in Figs. 8 and 9, and there is pivotally mounted on a pin 112 a knife sustaining arm 113, Figs. 5 and 9, having an end portion 114 for engagement by the hand, so that said knife sustaining arm 113 may be readily thrown into and out of position beneath the lower end or surface of the knife holder 110, the engaging part of said knife sustaining arm 113 being preferably bifurcated, as indicated in Fig. 8.

From the construction thus far described it will be apparent that, upon turning the knife sustaining arm 113 outward from under the holder 110, the knife and its screw-threaded rod 109 may be readily moved downward in its guideways 106 and detached from the knife carrier slide 92 and a new or different character of knife substituted therefor. It will also be obvious that, by adjustment of the holder or nut 110 upon the rod 109, the path of the knife cutting action may be varied.

A shoe, the heel of which is to be breasted, having been mounted upon the shoe support or jack and moved into position, and the presser-plate 40 having been preliminarily forced downward upon the heel by means of the treadle, as hereinbefore described, and said treadle having been further depressed to start the driving shaft into power operation, it will be seen that the first action of the device hereinbefore described will be to clamp the presser-plate firmly upon the heel and to lock the shoe support or jack with the shoe in heel breasting position, so that the shoe is no longer capable of being moved with respect to the parts to operate upon it. Upon further movement of the driving shaft, the eccentric 105 will pull down or depress the knife carrier slide yieldingly, the knife, during its cutting action, passing close to and being engaged by the curved edge of the presser-plate 40, in a manner as will be readily understood. It is desirable that the cutting action of the knife be arrested so that it will not cut into the material of the shoe sole, and to this end the following means is employed.

Mounted upon the knife carrier slide 92, preferably at the front thereof, is a stop carrier 115, said stop carrier being provided with a stop 116 which, under certain conditions to be hereinafter described, may be arrested during the cutting action of the knife and prevent the latter from injuring the shoe sole. As one means of carrying this feature of the invention into effect, the stop 116 is mounted on a screw-threaded rod 117 supported in suitable apertures 118, Fig. 8, in the stop carrier, said screw-threaded rod 117 being prevented from turning movement in the said carrier by means of a screw or pin 119. Mounted upon the screw-threaded rod 117 is a nut 120, Fig. 8, which is embraced by the upper and lower walls of a slot 121, Fig. 5, formed in the stop carrier 115, the construction being such that upon rotative movement of the nut 120 the screw-threaded rod 117 will be raised or lowered with respect to the cutting edge of the knife to thereby adjust the position of the stop 116.

Mounted for reciprocating movement in suitable ways 122, preferably formed in the knife carrier slide 92, Fig. 9, is a breasting stop carrier 123, Figs. 5 and 8, having pivotally mounted at its lower end 124 the breasting stop 125, Figs. 5 and 8, said breasting stop 125 being preferably so connected to the lower end of the breasting stop carrier by means of a detachable connection 126 in the form of a slide pin which may be readily withdrawn so that the breasting stop 125 may be readily detached from the carrier and another one substituted therefor. The lower bearing portion 127 of the breasting stop, Figs. 5 and 8, is preferably curved, as indicated, and formed with an extended surface so that such pressure as may be transmitted to the shoe sole through the breasting stop will not seriously mar it. It will be noted that the breasting stop 125 is formed with a central opening so that chips and pieces of leather detached from the heel will readily escape through the same, and that spring fingers 128 connected to the lower cross bar 124 of the breasting stop carrier serve to hold the breasting stop 125 in its normal position, as indicated in Figs. 5 and 8, to permit the breasting stop to yield under the action of force.

Mounted on the shaft 88 carried by suitable bearings on the top portion 2 of the machine frame is the breasting stop actuating lever 129, Fig. 5, one end of which carries a block 130, Fig. 5, mounted in a slot 131 in the top portion of the breasting stop carrier 123, the construction being such that upon movement of the breasting stop lever 129 the breasting stop carrier may be raised and lowered in its bearings in a manner as will presently appear. Connected to the opposite end of the breasting stop actuating lever 129 is the rod 132, Fig. 5, extending downward within the main column and connected, Fig. 3, at its lower end, to an arm 133 of a bell crank lever pivoted at 134 and carrying on its other arm 135 a roll 136 which engages a cam path 137 formed in a cam secured to the driving shaft 5. Since the cam path actuates the bell crank lever positively and through a uniform stroke, and since the thickness or character of the work may vary and consequently the stroke of the breasting stop slide be varied, it is desirable that the connection between the cam 137 and the stop slide shall be of a yielding character, and to this end the outer arm 138 of the lever 129, Fig. 5, is provided with a rock shaft 139 carrying a block 140 through an aperture of which passes the upper end 141 of the rod 132, the upper end of said rod above the block being provided with a suitable washer and nut 142, Fig. 5. Surrounding the upper portion 141 of the rod 132 is a spring 143, the upper end of which bears upon the under surface of the block 140 and the lower end upon the upper surface of a turn-buckle 144 by which said rod 132 may be adjusted as to length, in a manner as will be readily understood.

From the construction thus far described it will be apparent that upon operation of the main driving shaft 5 the breasting stop carrier 123 will be moved downward into contact with the shank portion of a shoe resting upon the shoe support or jack, and that after the breasting stop has met the shank of the shoe the spring 143 will yield and prevent injury to the shoe sole. When the breasting stop is thus in position on the sole of the shoe, if no means were provided to sustain the breasting stop in this position it would be forced with injurious pressure upon the shoe sole by the stop 116 as it contacts with the part 124 of the breasting stop carrier during the cutting movement of the knife, and to avoid this injurious action the present invention contemplates the provision of means whereby, when the breasting stop is in contact with the shoe and the knife moves downward in its cutting action, the breasting stop will be sustained or locked in its position from the machine frame or other stationary part. As one means of attaining this end the invention contemplates the following construction, reference being had to Figs. 1 and 5. Mounted to slide in suitable ways 145 extending transversely of the bracket 3, Figs. 1 and 5, is a breasting stop support preferably formed as a wedge 146, the breasting stop carrier 123 being provided with a coacting shoulder 147 adapted to contact with the inclined surface 148 of the wedge or support 146 in a manner as will presently appear. Connected to the wedge 146 is an actuator or arm 149, Figs. 1 and 5, pivoted to the bracket 3 at 150 and having an arm 151 to which is connected one end of a spring 152, the other end of said spring being connected at 153 to a fixed part, as a pin projecting from the bracket 3. The actuator or arm 149 has a pin 154 extending into a slot 155 provided near the outer portion of the wedge 146, the construction being such that the spring 152 normally acts to force the wedge inward or to the right, Fig. 5. Mounted upon the knife carrier slide 92 is a track or cam 156 having an inclined upper end 157, as indicated in Fig. 5. A roll 158 carried by the arm or actuator 149 is adapted to ride on the track or cam 156 as the knife carrier slide is moved up and down during its cutting and retreating action, the construction being such that upon downward movement of the knife and prior to its final cutting movement the track or cam 156 moves down from under the roll 158, thus permitting the spring 152 to move the wedge or stop 146 inward or to the right, Fig. 5, until its inclined surface 148 meets the coacting surface 147 on the breasting stop carrier 123, the latter in the meantime having been moved downward so that the breasting stop 127 rests upon the sole of the shoe. It will thus be apparent that the breasting stop carrier 123 is now sustained by the stop or wedge 146 so that any pressure applied to the breasting stop carrier slide will be transmitted to the wedge 146 rather than to the shoe sole.

In order that the wedge 146 may not be displaced by pressure upon its inclined surface of the coacting surface 147 on the stop carrier slide, the wedge is provided with a flange 159, Figs. 1 and 5, which in addition to moving in the guideway 145 is embraced by the bifurcated end 160 of an arm 161, see dotted lines Fig. 5, said arm being pivoted at 162 and carrying at its lower end a roll 163 adapted to ride on a cam or track 164 having an inclined end 165 secured to the knife carrier slide 92, the construction being such that as the knife carrier slide moves downward in the cutting action of the knife the roll 158 will first be freed from the track 156 and the spring 152 will move the wedge 146 inward to the right until its inclined surface 148 finds the coacting surface 147 on the breast stop slide which in the meantime has been moved downward until the breasting stop 127 contacts with the sole of the shoe. When the parts have assumed this relation and the knife carrier slide 92 continues in its downward movement, the track 164 moves from under the roll 163 on the lever 161, and said lever is then freed to the action of its spring 166, so that its bifurcated upper end 160 bites or grasps the flange 159 of the wedge and locks the wedge in the position it assumed when it found the surface 147 on the breasting stop carrier slide.

In the reverse movement of parts after the breasting operation, the knife carrier slide in moving upward first engages the track 164 with the roll 163 of the lever 161 and unlocks the cam 146, whereupon continued upward movement of the knife carrier slide causes the cam or track 156 to engage the roll 158 of the actuator or arm 149 and move the wedge outward or to inoperative position. As the parts move upward to inoperative position, it is desirable that any chips or pieces of leather detached by the breasting operation be swept from the shoe shank or sole and to this end the following construction is provided as one embodiment of this feature of the invention. Pivotally mounted at 167, Fig. 5, to the column 1 is an arm 168, to the outer end of which is pivotally connected at 169 a sweeper arm 170 to the upper or free end whereof is connected a wire 171 preferably formed with a coil 172 and having its end secured to the sweeper arm 170 by means of a set screw 173, as indicated in Figs. 5 and 8.

The sweeper arm 170 passes through a slot 174 of the machine frame and between two stationary pins 175 secured to the machine frame, the construction being such that the pins 175 guide the sweeper arm in its movement. The arm 168, hereinbefore described, is provided with a toe 176, Fig. 5, and is normally held in depressed position, as indicated in Fig. 5, by means of a cord or connection 177 and spring 178, Fig. 3, said spring 178 having its end secured at 179. The arm 168 is likewise provided with a lug 180, Fig. 5, provided with a recess 181 in which fits a piston 182 carried by a stem 183 supported at 184 from the column 1, said parts acting as a dash pot to yieldingly arrest the downward movement of the arm 168 after it has been raised, in a manner as will presently appear.

Pivotally supported by the column 1 at 185 is a bell crank lever, one arm 186 of which has pivoted to the end thereof at 187 a trip 188, the lower end 189 of said trip being connected to one end of a spring 190, the other end of which is connected to the fixed part at 191, the construction being such that the trip 188, when the arm 186 is moved to the left or contra-clockwise, Fig. 5, may yield as it engages the toe 176 of the arm 168, but as the arm 186 of the bell crank is moved clockwise, and when the trip 188 is at the left of the toe 176, said trip will lift the arm 168 until it passes under the toe 176, thereby moving the sweeper arm 170 in its sweeping action to carry the end of the wire 171 across the shoe shank at the breast of the heel, movement of the sweep in the opposite direction being accomplished by the cord or connection 177 and the spring 178, as hereinbefore described.

To accomplish the desired movement of the arm 186, said arm 186 has connected thereto an actuator 192, Fig. 5, engaging at its end 193 a recess in the collar 194 secured to the rod 132 for actuating the breast stop carrier, the construction being such that as the breast stop carrier rod 132 moves upward to bring the breast stop 127 into contact with the shoe, the trip 188 moves outward under the toe 176, being tilted on its pivot 187 during such movement and when to the left of the toe 176 it springs out under the action of the spring 190, so that on the downward movement of the rod 132, Fig. 5, and during the upward movement of the breasting stop 127, the wire 171 will be moved by the sweeper arm 170 across the shank of the shoe, as will be readily understood.

It has been found in practice that in treating some characters of material chips are liable to fly forward through the opening of the breasting stop 127, and to obviate any injurious effect to the operator, standing in front of the machine, there is mounted at 195, Figs. 5 and 7, a guard carrier 196 comprising an arm extending downward from its pivotal support 195 and having projecting laterally therefrom a guard or shield 197 preferably formed of leather or other desirable material. The arm 196 at its upper portion is provided with the flat faces 198 and 199, against which may bear the end of a plunger 200, Fig. 7, normally pressed into contact with one or the other of said flattened surfaces by a spring 201, the construction being such that when the guard 197 is thrown downward into guard position, the plunger 200 will maintain it in that position, and when thrown upward by slight force exerted thereon the guard will be held in its upper or raised position to enable ready access to the knife or other parts.

It will be noted that the nut 120, Figs. 5 and 8, is provided with spirals on its outer surface. These spirals are designed to engage a finger 202, Figs. 5 and 8, bent around the nut 120 and bearing at its opposite end portions upon the face of the stop carrier 115, a gage 203 preferably being provided along one edge of the stop carrier to indicate by the movement of the finger 202 the adjustment made to the stop 116.

In order that the operator may readily adjust the presser-plate 40 to the height of the shoe to be treated, the presser-foot slide 30, Figs. 1 and 5, is provided with a bracket arm 204 to which is connected a pointer or indicator 205, the end of which travels over a scale 206, Fig. 5, which scale may be appropriately numbered according to the sizes or heights of heels.

In order that the lower edge of the knife may be adjusted to proper position with respect to the scope of the knife carrying slide and thereby properly cut the breast of the heel, it is desirable that the sleeve or holder 110 be adjusted to proper position on the screw stem 109 secured to a knife. This is particularly desirable when, after grinding the edge of the knife to sharpen it, the length of the knife has become shortened, as will be readily understood, and to this end the frame of the machine is provided with two gages 207 and 208, Fig. 1, on the lower one 208 of which the edge of the knife after grinding may rest and the holder or sleeve 110 be then adjusted by rotative movement on the stem 109 to bring its upper surface against the under surface of the upper gage 207. After this adjustment the knife may be readily placed in its guideways and moved upward into position on the knife carrying slide 92, the upper surface of the sleeve or holder 110 at such times bearing against the under surface of the stop 111 so that the edge of the knife will be in proper position with respect to the stroke of the knife carrying slide, as will be readily understood.

The mode of operation of the machine will be apparent to those skilled in the art from the above described construction and its related parts, and while the invention contemplates the above construction as one embodiment or form of the invention, it is to be understood that the invention is not circumscribed by the details herein shown and described as such embodiment thereof, but is definitely set forth in the claims.

What is claimed is:

1. In a heel breasting machine, the combination of breasting means, a breasting stop movable into contact with the shoe, and a sliding wedge movable under a part connected to the breasting stop to support the breasting stop while the stop arrests the operation of the breasting means.

2. In a heel breasting machine, the combination of breasting means, a breasting stop, a member movable into the path of movement of a part connected to the breasting stop to positively support the breasting stop while the stop arrests the operation of the breasting means, and a lock for holding the said member in arresting position.

3. In a heel breasting machine, the combination of heel breasting means, a breasting stop movable toward and from the work and provided with a shouldered portion, and means coacting with said shouldered portion and sustained by the machine frame for positively supporting the breasting stop independent of the shoe during the action of the breasting means.

4. In a heel breasting machine, the combination of heel breasting means, a breasting stop, means for positively supporting the breasting stop independent of the shoe during the action of the breasting means, and means for holding the supporting means in arresting position.

5. In a heel breasting machine, breasting means, a breasting stop to engage the work, a slide movable into position to positively support the stop independent of the work while the stop arrests the action of the breasting means, and means for moving the slide.

6. In a heel breasting machine, the combination of heel breasting means, a breasting stop adapted to contact with a shoe and determine the extent of action of the breasting means, a support for the breasting stop to positively sustain the said stop independent of the shoe during action of the breasting means, and means to move said support into and out of operative position.

7. In a heel breasting machine, the combination of heel breasting means, a breasting stop adapted to contact with a shoe and determine the extent of action of the breasting means, a support for the breasting stop to sustain the said stop independent of the shoe during action of the breasting means, means to move said support into and out of stop sustaining position, and a lock to hold the support in its stop sustaining position.

8. In a heel breasting machine, heel breasting means, a breasting stop adapted to contact with the shoe and determine the extent of action of the breasting means, and means for positively sustaining the breasting stop from the machine frame and independent of the shoe during action of the breasting means.

9. In a heel breasting machine, the combination of breasting means, a breasting stop and its carrying slide, a supporting member carried by the said slide, a coöperating supporting member having a supporting surface, and means for moving said supporting members into contact to positively sustain the breasting stop independent of the work during the action of the breasting means.

10. In a heel breasting machine, the combination of breasting means, a breasting stop to arrest the movement of the breasting means, a carrier for said stop, a wedge member, and means for moving the wedge member into the path of movement of the breasting stop carrier to support the breasting stop independent of the work.

11. In a heel breasting machine, the combination of breasting means, a breasting stop to arrest the movement of the breasting means, a carrier for said stop, a wedge member, and means for moving the wedge member transversely into the path of movement of the carrier to bring its surface into and out of supporting relation with the carrier.

12. In a heel breasting machine, the combination of breasting means, a breasting stop to arrest the operation of the breasting means, a stop carrying slide, means to move the stop into contact with the shoe, a supporting member on the slide, and a wedge movable variable distances to bring it into contact with said supporting member to sustain the breasting stop independent of the work during the action of the breasting means.

13. In a heel breasting machine, the combination of heel breasting means, a breasting stop to engage the work, a wedge member movable into position to support the stop independent of the work while the stop arrests the action of the breasting means, a spring for moving the wedge member into supporting position, and positively actuated means for moving the wedge member in the opposite direction.

14. In a heel breasting machine, the combination of heel breasting means, a breasting stop to arrest the action of the breasting means and adapted to contact with the shoe, a supporting member positioned by the breasting stop when it rests upon the shoe, and sustaining means upon the machine frame movable beneath the positioned supporting member to support the breasting stop independent of the shoe as it arrests the breasting means.

15. In a heel breasting machine, the combination of heel breasting means, a breasting stop to arrest the action of the breasting means and adapted to contact with the shoe, a supporting member positioned by the breasting stop when it rests upon the shoe, sustaining means upon the machine frame movable beneath the positioned supporting member to support the breasting stop independent of the shoe as it arrests the breasting means, and actuating devices for said sustaining means.

16. In a heel breasting machine, the combination of heel breasting means, a breasting stop to arrest the action of the breasting means and adapted to contact with the shoe, a supporting member positioned by the breasting stop when it rests upon the shoe, sustaining means upon the machine frame movable beneath the positioned supporting member to support the breasting stop independent of the shoe as it arrests the breasting means, and locking devices for said sustaining means.

17. In a heel breasting machine, the combination of a knife carrying slide having ways for holding the edges of the knife, actuating means for said slide, a heel breasting knife, a stem projecting upward from said knife, a lug having an open slot for the said stem, and a swinging knife sustainer pivoted to the slide for detachably connecting the knife to its slide, and the free end of said sustainer being movable outward from the slide.

18. In a heel breasting machine, the combination of a knife carrying slide, actuating means therefor, a knife having a threaded stem, an adjustable sleeve or holder on said stem between the ends thereof, an open or bifurcated stop on the knife carrying slide to engage about the stem at one side of said sleeve, and a latch for engaging the opposite side of said sleeve.

19. In a heel breasting machine, the combination of a knife carrying slide, actuating means therefor, a knife having a threaded stem, an adjustable sleeve or holder on said stem, and means on the slide including a latch for detachably engaging the threaded stem above and below the adjustable sleeve or holder.

20. In a heel breasting machine, the combination of a knife carrying slide, actuating means therefor, said slide having a stop and a swinging knife sustainer, a breasting knife having a stem, and an adjustable holder or sleeve on said stem disposed between the stop and swinging knife sustainer.

21. In a heel breasting machine, the combination of a knife carrying slide having ways for supporting the edges of the knife, actuating means for said slide, a breasting knife having secured thereto a stem, a holder or sleeve screw threaded to said stem, a stop on the slide adapted to bear upon one surface of said holder or sleeve, and a swinging knife sustainer adapted to engage the other surface of said sleeve or holder to detachably hold the knife in working position on the slide.

22. In a heel breasting machine, the combination of heel breasting means, a breasting stop, a breasting stop carrier having a shoulder above the breasting stop, means for moving the breasting stop into contact with the shoe, a stop carried by the breasting means adapted to contact with the shoulder on the breasting stop carrier, means for relatively adjusting the stop on the breasting means and shoulder, and means for supporting the breasting stop independent of the work to arrest the action of the breasting means.

23. In a heel breasting machine, the combination of breasting means, a stop carrier movable with the breasting means, a stop on the stop carrier, means for adjusting the stop, said adjusting means having a spiral operating portion 120, and an arm engaging said spiral portion and movable thereby to indicate the adjustment of the stop on the stop carrier.

24. In a heel breasting machine, the combination of breasting means, a breasting stop carrier movable with the breasting means, a stop on the stop carrier, means for adjusting the stop with relation to the stop carrier, and an arm connected to and movable by the stop adjusting means to indicate the position of the stop with reference to the stop carrier.

25. In a heel breasting machine, the combination of heel breasting means, devices for operating the same, a breasting stop movable toward and from the work, and a guard movable with the breasting stop toward and from the work.

26. In a heeling machine, the combination of breasting means, a breasting stop to contact with the work and having an opening for the passage of chips, means for supporting the breasting stop independent of the work to arrest the action of the breasting means, and a guard movable with the breasting stop into and out of position in front of the heel to be breasted and extending over the opening in said stop.

27. In a heeling machine, the combination of breasting means, a breasting stop to contact with the work and having an opening for the passage of chips, a breasting stop carrier, and a chip guard mounted to move with the breasting stop into and out of position in front of the heel to be breasted and extending over the opening in said stop.

28. In a heeling machine, the combination of breasting means, a breasting stop to contact with the work and having an opening for the passage of chips, and a chip guard movable with the breasting stop and disposed in front of said opening, said guard being also mounted for movement independent of the stop.

29. In a heel breasting machine, the combination of heel breasting means, a breasting stop carrier having a shoulder to arrest the action of the breasting means, a breasting stop pivotally connected to the carrier to swing away from the heel being breasted, and means for yieldingly holding the stop from swinging movement.

30. In a heel breasting machine, the combination of heel breasting means, a breasting stop carrier, a breasting stop pivotally mounted to swing away from the heel being breasted, and a chip guard disposed in front of the breasting means and mounted to be swung away from the heel being breasted.

31. In a heel breasting machine, the combination of heel breasting means, a spring finger for removing chips severed by the breasting means, an arm carrying said spring finger, a lever carrying said arm, and means for actuating said lever as the heel breasting means returns to initial position after the breasting operation.

32. In a heel breasting machine, the combination of heel breasting means, a breasting stop, operating devices for said means and stop, a chip removing spring finger, and an arm, as 170, carrying said finger, said arm being actuated as the said devices move to initial position to sweep the spring finger transversely over the sole in front of the heel to remove chips from the machine.

33. In a heel breasting machine, the combination of heel breasting means, a breasting stop to contact with the work, operating devices for said breasting stop, and chip removing means actuated by said operating devices to sweep over the shoe sole.

34. In a heel breasting machine, the combination of heel breasting means, a presser-plate, means for giving a preliminary pressure of the presser-plate upon the heel to enable it to be positioned with respect to the edge of the presser plate, power actuated means for giving a clamping pressure to said presser plate upon the heel, and locking means at the rear of the shoe when the latter is in breasting position for locking the shoe in breasting position subsequent to the preliminary pressure of the presser-plate and during the acting of the breasting means.

35. In a heel breasting machine, the combination of heel breasting means, a breasting stop adapted to contact with the shoe, means for operating said stop toward and from the shoe, a lock disposed at the rear of the breasting means for holding a shoe in position during the breasting action, and means controlled by the breasting stop operating means for controlling said lock.

36. In a heel breasting machine, the combination of heel breasting means, a presser-plate carrier, a presser-plate carried thereby, operator controlled means for giving the presser-plate a preliminary pressure upon the heel, power means for subsequently increasing the pressure of the presser-plate, right and left threaded rods connecting the presser-plate carrier to its actuating means, a hand wheel having a left and right interiorly threaded sleeve engaging said rods, and a lock disposed at the rear of the presser plate acting subsequent to the application of the increased pressure to hold the shoe in position during the action of the breasting means.

37. In a heel breasting machine, the combination of heel breasting means, a presser-plate carrier, a presser-plate mounted thereon, means for adjusting the presser-plate, an indicating scale sustained by the carrier, and a pointer movable with the adjustable presser-plate.

38. In a heel breasting machine, the combination of heel breasting means, a breasting stop having a shoulder, a movable sustaining member for the breasting stop, and means controlled by movement of the breasting means for moving said member into position to meet said shoulder and positively support the breasting stop as the breasting means descends.

39. In a heel breasting machine, the combination of heel breasting means, a breasting stop having a shoulder, a movable sustaining member for the breasting stop, means controlled by movement of the breasting means for moving said member into position to meet said shoulder and positively support the breasting stop as the breasting means descends, and a lock for said sustaining member.

40. In a heel breasting machine, the combination of heel breasting means, a support for sustaining the shoe during the action of the breasting means, a presser plate to act upon the heel first with a preliminary and then a final pressure, an arm extending from the shoe supporting means to the rear thereof, and a lock for engaging said arm after the application of the preliminary presser by the presser plate and when the heel has been positioned with respect to said plate to hold the shoe supporting means in position during the action of the breasting means.

41. In a heel breasting machine, the combination of breasting means, a breasting stop, a guard movable with the breasting stop, said guard being pivotally mounted, and means to hold the guard in operative or inoperative position with reference to the breasting stop.

42. In a heel breasting machine, the combination of a reciprocating heel breasting knife, a breasting stop to arrest the action of the breasting knife and adapted to engage the shoe, a supporting member for the breasting stop positioned by the breasting stop when it meets the shoe, and means for engaging beneath said supporting member and positively sustaining the stop independent of the shoe during the action of the breasting knife.

43. In a heel breasting machine, the combination of a reciprocating heel breasting knife, a breasting stop and its carrier to arrest the action of the knife, a shoulder, as 147, on said carrier, and a slide, as 146, for engaging said shoulder and supporting the said carrier independent of the shoe and in the position it assumes when the stop rests upon the shoe.

44. In a heel breasting machine, the combination of a reciprocating heel breasting knife, a breasting stop to arrest the action of the breasting knife when it has completed the breasting action, a shoulder, as 147, connected to the breasting stop, yieldingly actuated means for moving the stop into contact with the shoe and positioning said shoulder, and means supported from the machine frame to be engaged by said shoulder for supporting the breasting stop independent of the shoe during the action of the breasting knife.

45. In a heel breasting machine, the combination of a reciprocating heel breasting knife, a breasting stop and its carrier to arrest the action of the knife, a shoulder, as 147, on said carrier, a slide, as 146, for engaging said shoulder and supporting the said carrier independent of the shoe and in the position it assumes when the stop rests upon the shoe, and means for locking the slide in operative position.

46. In a heel breasting machine, the combination of a reciprocating heel breasting knife, a support for sustaining and holding a shoe in position for the action of the heel breasting knife, a presser plate for pressing upon the heel to be breasted, an actuating rod for said presser plate, a treadle, yielding connections between the treadle and rod for preliminarily seating the presser plate upon the heel, a cam, a spring on said rod, and a loose collar acting on said spring in response to the cam for seating the presser plate with power upon the heel.

47. In a heel breasting machine, the combination of heel breasting means, operating devices therefor, a shoe support movable to and from operative relation with the breasting means to sustain a shoe during the breasting operation, a lock disposed in rear of the breasting means to lock the shoe in position during the action of the breasting means, and means controlled by the breasting operating devices to actuate said lock.

48. In a heel breasting machine, the combination of heel breasting means, operating devices therefor, a shoe support movable to and from operative relation with the breasting means, a lock disposed in rear of the breasting means when the shoe is in heel breasting position for holding the shoe support in operative relation with the breasting means during the breasting operation, and means acting automatically upon starting the machine for operating the lock to cause the latter to become effective to hold the shoe support in operative position.

49. In a heel breasting machine, the combination of heel breasting means, operating devices therefor, a shoe support movable to and from operative relation with the breasting means, a lock, comprising a member projecting from the shoe support and a member disposed in rear of the breasting means, for holding the shoe in heel breasting position, and means acting automatically to cause engagement and disengagement of the locking members.

50. In a heel breasting machine, the combination of heel breasting means, operating devices therefor, a shoe support movable to and from operative relation with the breasting means, an arm projecting from the shoe support and having one member of a lock for holding the shoe support in operative relation with the breasting means, another locking member in rear of the breasting means, said locking members comprising interlocking engaging teeth, and means rendered effective upon starting the machine for causing engagement of the locking members after the shoe has been positioned for the breasting operation.

51. In a heel breasting machine, the combination of heel breasting means, operating devices therefor, a shoe support movable to and from operative relation with the breasting means, an arm projecting from the shoe support and having one member of a lock for holding the shoe support in operative relation with the breasting means, another locking member, means acting normally to move it into locking position, and means controlled through the breasting devices to free said locking member to movement in response to said normally acting means.

52. In a machine for treating heels, the combination of a reciprocating tool for engaging the heel, a single operating means for giving the tool its actuating stroke in both directions, means comprising a wedge for determining the length of the active stroke of the tool, and means controlled by a characteristic of the work for setting said wedge.

53. In a machine for treating heels, the combination of a reciprocating tool for engaging the heel, power means for reciprocating the tool in both directions, means comprising a wedge for determining the stroke of the tool, means controlled by a characteristic of the work for setting said wedge, and means for positively maintaining said wedge in position during the action of the tool upon the work.

54. In a machine for treating shoes, the combination of a tool, means for imparting an active stroke to said tool, a movable wedge for predetermining the extent of the tool action in accordance with a characteristic of a shoe part, means for moving the wedge, and means controlled by tool movement for permitting the operation of the wedge moving means.

55. In a machine for acting upon a portion of a shoe, a tool, means for yieldingly operating the tool, means comprising a wedge for automatically predetermining the limit of tool action in accordance with a characteristic of a shoe part, means controlled by tool movement for positioning the wedge, and means for locking the wedge in position.

56. In a machine for treating the heels of boots and shoes, the combination of a tool, an actuator for said tool including a part adapted to yield, a stop having a part to engage the shoe to determine the position of the stop for receiving the pressure of the actuator, and wedge means for supporting the stop in the position assumed by it.

57. In a machine for treating the heels of boots and shoes, the combination of a tool, operating means therefor, a shoe support movable by hand to and from operative position with relation to the tool, a lock disposed in rear of the tool to lock the shoe support in position during the action of the tool, and means controlled by the tool operating means to render the lock effective.

58. In a machine for treating the heels of boots and shoes, the combination of a tool, operating means therefor, a shoe support movable by hand to and from operative position with relation to the tool, a lock disposed in rear of the tool to lock the shoe support in position during the action of the tool, said lock comprising interengaging teeth, and means controlled by the tool operating means to render the lock effective.

59. In a heel breasting machine, the combination of breasting means and operating devices therefor, a shoe support pivotally mounted for movement to and from operative relation with the breasting means, an arm projecting from the shoe support and carrying one member of a locking device, a second member of said locking device back of the breasting means, and means rendered operative upon starting the machine to cause said locking members to engage to lock the shoe support in operative position.

60. In a heel breasting machine, the combination of a pivotally mounted shoe support, an arm projecting therefrom and carrying a locking member, provided with a series of teeth, heel breasting means and operating devices therefor, a second locking member at the rear of the breasting means comprising a plurality of teeth, and means for automatically causing engagement of the teeth of said locking members.

61. In a machine for operating upon boots and shoes, the combination of a reciprocating tool, a power-operated actuator for giving the tool its operating stroke in both directions, and means comprising a wedge for varying the operating stroke of the tool.

62. A machine for treating the heels of boots and shoes, devices carrying a tool, power means for reciprocating said devices in both directions through a determined range of movement, and means including a movable wedge for varying the range of movement of the tool.

In testimony whereof, I have signed my name to this specification, in the presence of two subscribing witnesses.

THOMAS G. PLANT.

Witnesses:
  Eben van Evera,
  Amelia M. Ross.